United States Patent
Savoor et al.

(10) Patent No.: US 10,952,225 B2
(45) Date of Patent: *Mar. 16, 2021

(54) ADAPTIVE RATE AND REACH OPTIMIZATION FOR WIRELESS ACCESS NETWORKS

(71) Applicant: AT&T INTELLECTUAL PROPERTY I, L.P., Atlanta, GA (US)

(72) Inventors: Raj Savoor, Walnut Creek, CA (US); Canhui Ou, Danville, CA (US); Jin Wang, Walnut Creek, CA (US)

(73) Assignee: SBC KNOWLEDGE VENTURES, L.P.

( * ) Notice: Subject to any disclaimer, the term of this patent is extended or adjusted under 35 U.S.C. 154(b) by 239 days.

This patent is subject to a terminal disclaimer.

(21) Appl. No.: 15/922,622

(22) Filed: Mar. 15, 2018

(65) Prior Publication Data

US 2018/0206242 A1    Jul. 19, 2018

Related U.S. Application Data

(63) Continuation of application No. 13/957,588, filed on Aug. 2, 2013, now Pat. No. 9,949,274, which is a
(Continued)

(51) Int. Cl.
*H04W 72/08* (2009.01)
*H04L 12/24* (2006.01)
(Continued)

(52) U.S. Cl.
CPC ....... *H04W 72/082* (2013.01); *H04L 41/5019* (2013.01); *H04W 24/00* (2013.01);
(Continued)

(58) Field of Classification Search
None
See application file for complete search history.

(56) References Cited

U.S. PATENT DOCUMENTS

| | | |
|---|---|---|
| 4,571,678 A | 2/1986 | Chaitin |
| 4,736,453 A | 4/1988 | Schloemer |

(Continued)

FOREIGN PATENT DOCUMENTS

EP    1643688    4/2006

OTHER PUBLICATIONS

Extended European Search Report from European Patent Office (E.P.O.), dated Jul. 31, 2012, for corresponding European patent application.
(Continued)

*Primary Examiner* — Jason E Mattis
*Assistant Examiner* — Hong Shao (57) ABSTRACT

A method is provided for managing performance of a wireless network by a server. The method includes generating performance data of the wireless network by having a plurality of network elements communicate with each other to determine signal attenuation among each pair of the plurality of network elements. The method also includes determining interference within the wireless network interference based on generated performance data, and generating an interference matrix identifying the interference in the wireless network. The method further includes generating an adjacency matrix, based on the interference matrix, identifying locations having unacceptable levels of interference in the wireless network, and allocating channel frequencies and corresponding transmission powers in the wireless network based on the adjacency matrix, in order to maximize an aggregate throughput of the wireless network.

20 Claims, 5 Drawing Sheets

| | Access Point 10 | Access Point 20 | Access Point 30 | Client 14 | Client 24 | Client 34 |
|---|---|---|---|---|---|---|
| Access Point 10 | | 30 dB | 0 dB | 10 dB | 40 dB | 50 dB |
| Access Point 20 | | | 52 dB | 47 dB | 8 dB | 70 dB |
| Access Point 30 | | | | 50 dB | 60 dB | 12 dB |
| Client 14 | | | | | 54 dB | 49 dB |
| Client 24 | | | | | | 40 dB |
| Client 34 | | | | | | |

Related U.S. Application Data continuation of application No. 13/270,542, filed on Oct. 11, 2011, now Pat. No. 8,503,419, which is a continuation of application No. 11/432,490, filed on May 12, 2006, now Pat. No. 8,064,413.

(51) Int. Cl.

| | | |
|---|---|---|
| *H04W 24/00* | (2009.01) | |
| *H04W 52/24* | (2009.01) | |
| *H04W 16/18* | (2009.01) | |
| *H04W 28/22* | (2009.01) | |
| *H04W 48/16* | (2009.01) | |
| *H04W 84/12* | (2009.01) | |
| *H04W 28/04* | (2009.01) | |

(52) U.S. Cl.
 CPC ............ *H04W 52/24* (2013.01); *H04L 41/22* (2013.01); *H04W 16/18* (2013.01); *H04W 28/04* (2013.01); *H04W 28/22* (2013.01); *H04W 48/16* (2013.01); *H04W 72/08* (2013.01); *H04W 84/12* (2013.01)

(56) References Cited

U.S. PATENT DOCUMENTS

| | | | |
|---|---|---|---|
| 5,561,841 | A | 10/1996 | Markus |
| 6,023,459 | A | 2/2000 | Clark et al. |
| 6,094,584 | A | 7/2000 | Khanna et al. |
| 6,311,067 | B1 | 10/2001 | Sammour et al. |
| 6,314,294 | B1 | 11/2001 | Benveniste |
| 6,496,490 | B1 | 12/2002 | Andrews et al. |
| 6,892,073 | B2 | 5/2005 | Fattouch |
| 7,190,743 | B2 | 3/2007 | Learned |
| 7,203,850 | B2 * | 4/2007 | Guo ...................... H04L 12/12 713/300 |
| 7,327,697 | B1 | 2/2008 | Friday et al. |
| 7,366,504 | B2 | 4/2008 | Backes |
| 7,477,914 | B2 | 1/2009 | Jalil et al. |
| 2003/0171122 | A1 | 9/2003 | Kim et al. |
| 2003/0198200 | A1 | 10/2003 | Diener et al. |
| 2004/0072566 | A1 | 4/2004 | Kuwahara et al. |
| 2004/0078598 | A1 | 4/2004 | Barber et al. |
| 2004/0162082 | A1 | 8/2004 | Bacceli et al. |
| 2004/0248580 | A1 | 12/2004 | Backes et al. |
| 2005/0003827 | A1 * | 1/2005 | Whelan ................ H04W 16/10 455/454 |
| 2005/0058151 | A1 | 3/2005 | Yeh |
| 2005/0085190 | A1 | 4/2005 | Nishikawa |
| 2005/0122231 | A1 | 6/2005 | Varaiya et al. |
| 2005/0210157 | A1 | 9/2005 | Sakoda |
| 2005/0288031 | A1 | 12/2005 | Davis et al. |
| 2006/0067258 | A1 | 3/2006 | Golestani et al. |
| 2006/0146754 | A1 | 7/2006 | Bejerano |
| 2006/0172781 | A1 | 8/2006 | Mohebbi |
| 2006/0227751 | A1 * | 10/2006 | Theobold ............. H04W 16/18 370/338 |

OTHER PUBLICATIONS

Canadian Office Action from Canadian Intellectual Property Office, dated May 10, 2011.

* cited by examiner

|  | Access Point 10 | Access Point 20 | Access Point 30 | Client 14 | Client 24 | Client 34 |
|---|---|---|---|---|---|---|
| Access Point 10 |  | 30 dB | 0 dB | 10 dB | 40 dB | 50 dB |
| Access Point 20 |  |  | 52 dB | 47 dB | 8 dB | 70 dB |
| Access Point 30 |  |  |  | 50 dB | 60 dB | 12 dB |
| Client 14 |  |  |  |  | 54 dB | 49 dB |
| Client 24 |  |  |  |  |  | 40 dB |
| Client 34 |  |  |  |  |  |  |

FIGURE 4

|  | Access Point 10 | Access Point 20 | Access Point 30 |
|---|---|---|---|
| Access Point 10 |  | x |  |
| Access Point 20 | x |  | x |
| Access Point 30 |  | x |  |

FIGURE 5    FIGURE 6 ured on Apr. 17, 2018, which is
ADAPTIVE RATE AND REACH OPTIMIZATION FOR WIRELESS ACCESS NETWORKS This application is a continuation of pending U.S. patent application Ser. No. 13/957,588, filed on Aug. 2, 2013, now U.S. Pat. No. 9,949,274, issued on Apr. 17, 2018, which is a continuation of U.S. patent application Ser. No. 13/270,542, filed on Oct. 11, 2011, now U.S. Pat. No. 8,503,419, issued on Aug. 6, 2013, which is a continuation of U.S. patent application Ser. No. 11/432,490, filed on May 12, 2006, now U.S. Pat. No. 8,064,413, issued on Nov. 22, 2011, the disclosures of which are expressly incorporated herein by reference in their entireties.

BACKGROUND

1. Field of the Disclosure

The present disclosure relates to wireless communications. More particularly, the present disclosure relates to controlling wireless local area networks (WLANs).

2. Background Information

Over the past several years, computer networks have become increasingly mobile. One wireless local area networking (WLAN) technology is WiFi, i.e., 802.11. WiFi is a member of the IEEE 802 family, which is a series of specifications for local area network (LAN) technologies. In this family, there are other well-known specifications such as 802.3, i.e., Ethernet. Another WLAN technology is WiMax defined by the IEEE 802.16 standard.

WLANs complement existing fixed networks by providing mobility to users, just as mobile telephones complement fixed wireline telephony. The advantage of mobility is gained by employing a much more open network medium: free space. However, as free space lacks a physical boundary, signals can be sent or received by any device complying with the WLAN standard and therefore different WLANs in a geographical region may interfere with each other. Wireless users in a home WiFi network often observe the presence of several WiFi LANs in their neighborhood. Some even detect that the signal of a neighbor's wireless router is much stronger than their own. When WLANs interfere with each other, connection speed in each LAN is adversely impacted and the aggregate throughput of the WLANs (consisting of all WLANs in one geographical area) is reduced.

Currently, there exist simple methods to reduce the interference between WLANs. Individual WiFi Access Points (AP) or WiFi routers may implement Transmit Power Control (TPC) and Dynamic Frequency Selection (DFS) services specified in the 802.11x standard. However, TPC and DFS do not aim at global optimization because they are independently and optionally implemented by individual WiFi LANs.

Without a central capacity and performance management system, it is unlikely for WLANs to coordinate with each other and to achieve overall maximum capacity. With WLANs becoming more and more popular and the interference between WLANs occurring more often, the lack of central capacity and performance management is severely degrading the performance of WLANs by reducing the connection speed of individual links and the aggregate throughput of the whole network.

There is a need for addressing the issues identified above.

DETAILED DESCRIPTION

In view of the foregoing, the present disclosure, through one or more of its various aspects, embodiments and/or specific features or sub-components, is thus intended to bring out one or more of the advantages as specifically noted below.

The present disclosure pertains to a centralized dynamic performance management (DPM) system for wireless networks consisting of independent wireless LANs, such as WiFi LANs and WiMax networks. The dynamic performance management system can coordinate the operation of independent WLANs and improve aggregate WLAN throughput.

In one aspect of the present invention, a computer readable medium stores a program for controlling network elements of wireless local area networks (WLANs). The program includes a WLAN network element polling code segment that receives interference data from the WLAN network elements, the interference data indicating network elements that interfere with the WLAN network elements. The program has a frequency/power determination code segment that determines a frequency and/or transmission power level for each WLAN network element to reduce interference with the interfering network elements. The program also has a transmitting code segment that transmits instructions to each WLAN network element to control the frequency and/or transmission power level of the WLAN network elements.

The WLANs can be 802.11 networks and/or 802.16 networks. In one embodiment, the instructions are a dynamic frequency selection (DFS) instruction and/or a transmit power control (TPC) instruction.

The frequency/power determination code segment can determine that the power level should be an increased power level when a signal attenuation value between an access point and a client is above a threshold value.

The frequency/power determination code segment can determine the frequency and/or the transmission power level by generating an adjacency matrix based upon the received interference data. The frequency and/or the transmission power level can be determined by graph coloring based upon the generated adjacency matrix. The graph coloring can include a number of colors that is equal to a number of channels available in the WLANs. The transmission power level can be a reduced power level for at least one of the WLAN network elements when the graph coloring requires more than the number of colors in order to reduce interference.

In another aspect, a dynamic performance management system controls wireless networks. The system includes a receiver that receives interference data from WLAN network elements, the interference data indicating network elements that interfere with the WLAN network elements. The system also includes a frequency/power determination system that determines a frequency and/or transmission power level for each WLAN network element to reduce interference with the interfering network elements. The system also has a transmitter that transmits instructions to each WLAN network element to control the frequency and/or transmission power level of the WLAN network elements.

In still another aspect, a wireless local area network (WLAN) control system includes access points that measure signal attenuation in communications with other WLAN network elements. The system also has a dynamic performance management system that receives signal attenuation data from the access points, determines a frequency and/or transmission power level for each of the access points to reduce interference with the other WLAN network elements, and transmits instructions to each access point to control the frequency and/or transmission power level of the access points.

In yet another aspect, a method for controlling network elements of wireless local area networks (WLANs) includes receiving interference data from the WLAN network elements, the interference data indicating network elements that interfere with the WLAN network elements. The method also includes determining a frequency and/or transmission power level for each WLAN network element to reduce interference with the interfering network elements. The method further includes transmitting instructions to each WLAN network element to control the frequency and/or transmission power level of the WLAN network elements.

According to an aspect of the disclosure, the aggregate throughput and reach of a wireless access networks, such as a WiFi or WiMax network, is improved through a dynamic performance management (DPM) system. The dynamic performance management system collects performance data from multiple devices and adaptively improves the rate and reach using adaptive and self learning controls, such as Transmit Power Control (TPC) and Dynamic Frequency Selection (DFS). Although the following description primarily refers to WiFi networks, the present invention contemplates alternative WLANs, such as WiMax networks.

Figure 2:
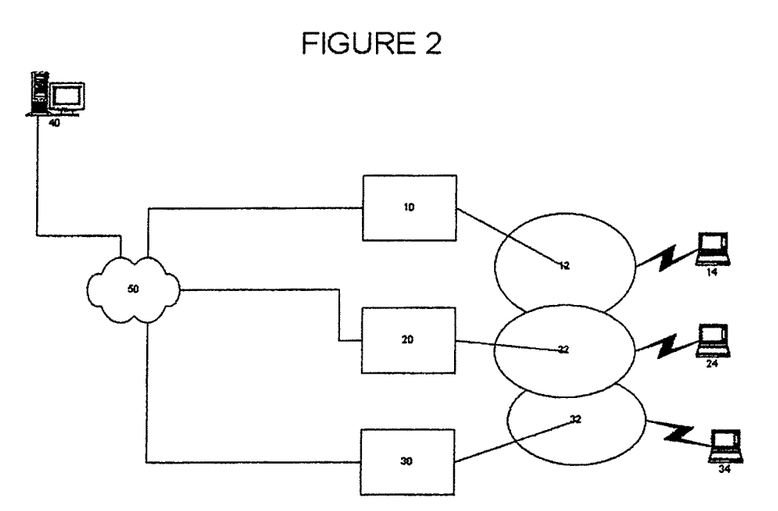
FIG. 2 shows an exemplary WLAN system including a dynamic performance management system, according to an aspect of the present invention.

FIG. 2 shows representative WiFis network with a centralized dynamic performance management (DPM) system 40. In FIG. 2, three access points (AP) 10, 20, 30 each have a corresponding coverage area 12, 22, 32. A WiFi client 14, 24, 34 is located in each coverage area 12, 22, 32 to enable communications with the corresponding access point 10, 20, 30. In this description, it is assumed that each access point only serves a single client for the sake of simplicity. Of course multiple clients can be served by an access point and more than three access points could be provided. The dynamic performance management system 40 connects to each access point 10, 20, 30 via a network 50, such as the Internet.

Each access point 10, 20, 30 may be connected to a distribution system such as a wired Ethernet (not shown), or they can lie in independent WiFi LANs with no direct connection between each other. The latter case is representative of a residential WiFi network, where each premise has an independent wireless LAN which connects to the Internet through, for example, DSL, cable or fiber. These wireless LANs do not communicate with each other.

During the network initiation phase, the dynamic performance management system 40 coordinates all access points 10, 20, 30 and clients 14, 24, 34 to conduct a medium characterization so as to obtain performance data, e.g., the signal attenuation, between any two WiFi devices (AP or client). Although signal attenuation is discussed, alternative interference measurements could be substituted, such as signal to noise ratio. Moreover, interference with outside sources, such as RADAR could be detected.

In an embodiment, interference is measured by a radio link measurement. For example, access point 10 sends a beacon to access point 20 with a fixed signal strength, such as 0 dBm. If access point 20 receives the signal and the power is—10 dBm, then the attenuation is determined to be 10 dB. Each network element attempts to communicate with each other network element in this manner to obtain a complete picture of network interference.

Figure 3:
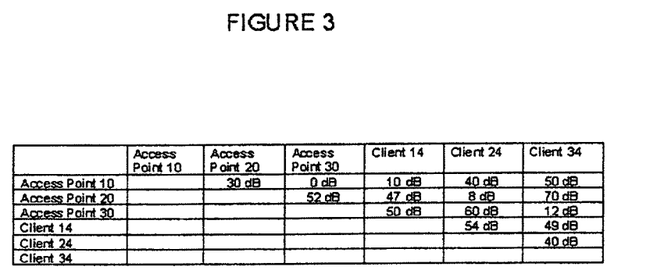
FIG. 3 shows an exemplary interference matrix, according to an aspect of the present invention.

At the end of characterization, the dynamic performance management system 40 populates an interference matrix. FIG. 3 shows an exemplary populated interference matrix. In FIG. 3, the value of a cell specifies the signal attenuation from the row WiFi device to the column WiFi device. For example, access point 10 has a 30 dB signal attenuation with respect to access point 20.

Figure 4:
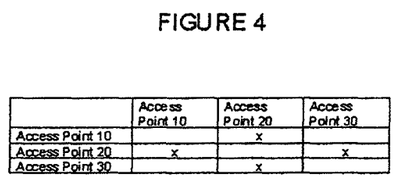
FIG. 4 shows an exemplary adjacency matrix, according to an aspect of the present invention.

Based upon the interference matrix, an adjacency matrix can be generated. FIG. 4 shows a simplified adjacency matrix based upon the interference matrix of FIG. 3. The adjacency matrix is simplified in that it only show access points 10, 20, 30, and not clients 14, 24, 34. However, the concept equally applies to clients as well as access points and any other network elements. In FIG. 4, an "x" in a cell indicates that the row WiFi device has an unacceptable level of interference with the column WiFi device. For example, FIG. 4 indicates that access point 10 has an unacceptable level of interference with access point 20, and also that access point 20 has an unacceptable level of interference with access point 30. Acceptable attenuation values are well known, and the measured values are compared with the acceptable values to determine whether unacceptable interference exists.

The connection speed between each access point/client pair, and hence the aggregate WiFi throughput, depends on the channel frequency allocation and the interference matrix of FIG. 3. As this dependency usually can be expressed analytically or numerically, the dynamic performance management system 40 will be able to improve (or possibly maximize) the overall WiFi throughput by optimizing the channel frequency allocation and transmit power for each access point/client pair. Under the control of the dynamic performance management system 40, some access point/client pairs may have to reduce transmit power if they are interfering severely with other access point/client pairs. On the contrary, some access point/client pairs may be able to use higher power than that specified by TPC service when the pair is far away from other access point/client pairs and therefore unlikely to impact them. For example, if the signal attenuation between an access point and its associated client is high, it is known that more power is needed. The converse can also be true, which could reduce interference with other access points and clients.

An adjacency matrix for different networks can be generated based on the interference matrix and the known acceptable levels of interference. Based upon the adjacency matrix, the dynamic performance management system 40 can then optimally allocate appropriate channels for each network so that the interference is reduced (e.g., minimized). In one embodiment, the technique employed is called "graph coloring."

Figure 5:
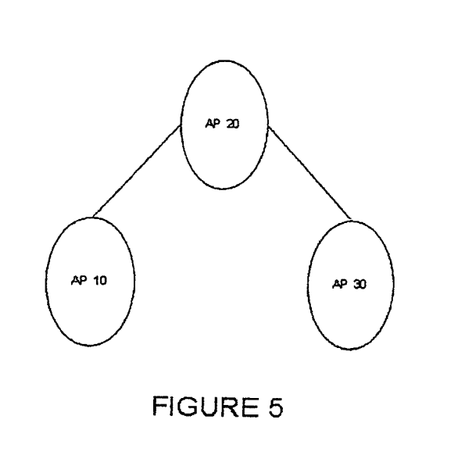
FIG. 5 shows an exemplary graph corresponding to the adjacency matrix of FIG. 4, according to an aspect of the present invention.

The adjacency matrix (e.g., as shown in FIG. 4) can be modeled as a graph by creating a vertex for each network element. An edge exists between two vertices A and B if there is an "x" marked at both cell (A:B) and cell (B:A). For example, the cell corresponding to access point 10 and access point 20, as well as the cell corresponding to access point 20 and access point 10 both contain an "x." Thus, an edge exists between access point 10 and access point 20, as shown in FIG. 5. Similarly, the cell corresponding to access point 20 and access point 30, as well as the cell corresponding to access point 30 and access point 20 both contain an "x." Thus, an edge exists between access point 20 and access point 30, as also shown in FIG. 5.

The vertices of the graph can then be colored in a way such that no adjacent vertices have the same color, or in other words, no interfering networks are assigned the same channel. When two interfering networks are assigned different channels, or frequencies, the interference between these two networks is significantly reduced. As a result, the channel assignment problem for wireless access networks to reduce interference can be equated to coloring the corresponding graph so that adjacent vertices have different colors.

Figure 6:
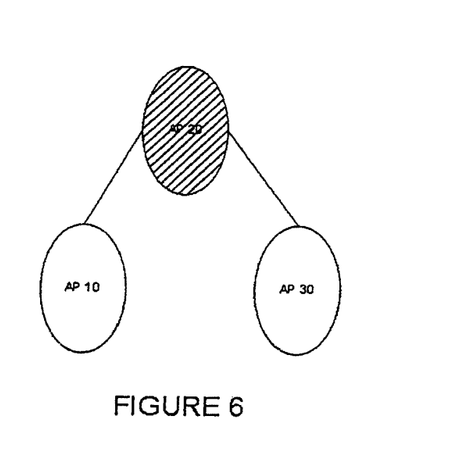
FIG. 6 shows an exemplary colored graph, according to an aspect of the present invention.

FIG. 6 shows the coloring results of the graph of FIG. 5. In FIG. 6, it can be seen that access point 20 is a different "color" than access point 10 and access point 30. That is, the shaded representation of access point 20 is different from the non-shaded representation of access points 10 and 30. Of course, in a color drawing, colors would be used instead of dotted and solid lines.

WiFi networks typically have 14 different channels (or 12 in some countries). Consequently, the dynamic performance management system 40 colors the corresponding graph with a maximum of 14 (or 12) colors. As the size of a WiFi network grows, it may become impossible to color the WiFi network with only 14 colors. In that case, the dynamic performance management system 40 can prune the number of edges in the corresponding graph so that 14 colors (or 12 colors) are enough. In other words, some vertices will have their power reduced (e.g., in an ad hoc manner) so that a smaller graph results from the interference analysis. In one embodiment, newly added nodes will have their power adjusted first.

Both access point and client may be mobile, implying the channel attenuation between them may vary frequently. Even when access point and client are fixed, the channel attenuation can still vary due to the temporal change of the wireless medium. In one embodiment, the above-described analysis is repeated every two weeks to compensate for the dynamic nature of the attenuation. In addition, a new access point or client may join in the WiFi network. When a new network element joins the WLAN, the interference matrix also needs to be dynamically changed. Whenever the channel attenuation matrix is updated, the dynamic performance management system 40 should decide if the allocation of channel frequency and transmit power for each access point/client pair should change in order to improve the aggregate WiFi throughput. Therefore, the dynamic performance management system 40 and the mechanism to improve aggregate WiFi throughput are both adaptive.

In summary, the dynamic performance management system architecture includes an adaptive data collection and monitoring centralized system; a dynamic and self learning performance control and provisioning system; and a reporting subsystem and network management console.

Figure 1:
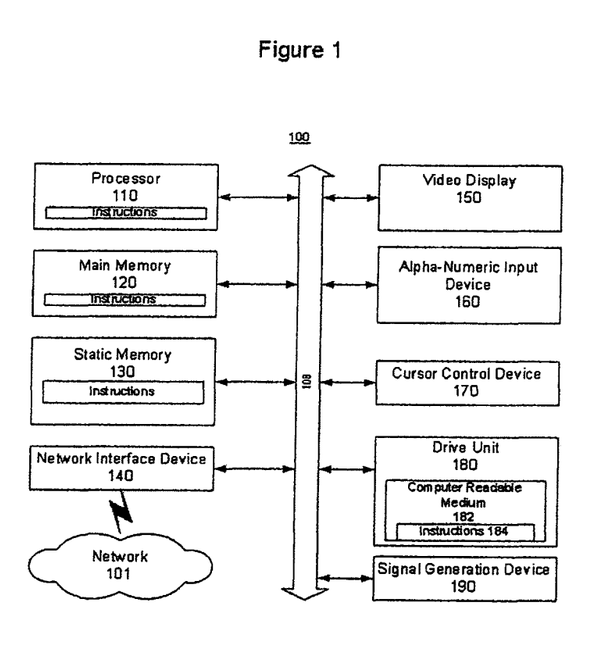
FIG. 1 shows an exemplary general computer system that can operate within the WLAN system.

Referring to FIG. 1, a description is now provided of an illustrative embodiment of a general computer system 100, on which the centralized WLAN control functionality can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A method for managing performance of a wireless network, the method comprising:

generating, by a server, performance data of the wireless network by having a plurality of network elements communicate with each other to determine signal attenuation among each pair of the plurality of network elements;
determining, by the server, interference within the wireless network based on the performance data that is generated;
generating, by the server, an interference matrix identifying the interference within the wireless network;
generating, by the server, an adjacency matrix based on the interference matrix identifying locations having unacceptable levels of interference in the wireless network;
allocating, by the server, channel frequencies and corresponding transmission powers in the wireless network, based on the adjacency matrix, in order to maximize an aggregate throughput of the wireless network;
modeling, by the server, the adjacency matrix as a graph by creating a vertex for each network element of the plurality of network elements; and
pruning, by the server, one or more most recently added nodes from the graph modeled from the adjacency matrix with created vertexes, starting with a newest added node when a total number of nodes exceeds a designated number of nodes so that a smaller graph results.

2. The method according to claim 1, wherein maximizing the aggregate throughput of the wireless network includes reducing the unacceptable levels of interference.

3. The method according to claim 2, wherein the unacceptable levels of interference are levels of interference that are greater than a predetermined acceptable level of interference.

4. The method according to claim 1, wherein the method is performed at predetermined fixed time intervals.

5. The method according to claim 1, wherein the wireless network includes fixed network elements and mobile network elements.

6. The method according to claim 1, wherein the method is performed when a new network element is added to the wireless network.

7. The method according to claim 4, wherein the predetermined fixed time intervals are restarted after the method is performed due to a new network element being added to the wireless network.

8. The method according to claim 1, wherein the plurality of network elements includes a plurality of access points and a plurality of clients, with each access point of the plurality of access points serving at least one client of the plurality of clients.

9. The method according to claim 8, wherein the plurality of access points includes an access point that has an independent wireless local area network that is connected to the Internet.

10. The method according to claim 1, wherein the determining interference within the wireless network is performed by polling the plurality of network elements.

11. The method according to claim 1, wherein the graph is colored such that no adjacent vertices have the same color, each color representing a communication channel.

12. The method according to claim 11, wherein each color represents one communication channel of a predetermined number of available communication channels.

13. The method according to claim 12, further comprising:

pruning at least one edge of the graph of the adjacency matrix so that the graph does not exceed the predetermined number of available communication channels when at least one additional network element is added to a local area network.

14. The method according to claim 13, wherein the pruning the at least one edge includes reducing power to at least one vertex.

15. The method according to claim 11, wherein the graph is colored using a maximum of 14 colors.

16. The method according to claim 13, wherein a most recently added network element has power reduced by the pruning the at least one edge.

17. A non-transitory tangible storage medium encoded with an executable program for managing performance of a wireless network that, when executed by a server, causes the server to perform operations, the operations comprising:
generating performance data of the wireless network by having a plurality of network elements communicate with each other to determine signal attenuation among each pair of the plurality of network elements;
determining interference within the wireless network based on the performance data that is generated;
generating an interference matrix identifying the interference in the wireless network;
generating an adjacency matrix based on the interference matrix identifying locations having unacceptable levels of interference in the wireless network;
allocating channel frequencies and corresponding transmission powers in the wireless network, based on the adjacency matrix, in order to maximize an aggregate throughput of the wireless network;
modeling the adjacency matrix as a graph by creating a vertex for each network element of the plurality of network elements; and
pruning one or more most recently added nodes from the graph modeled from the adjacency matrix with created vertexes, starting with a newest added node when a total number of nodes exceeds a designated number of nodes so that a smaller graph results.

18. A server for managing performance of a wireless network, the server comprising:
a processor for generating performance data of the wireless network, by having a plurality of network elements communicate with each other to determine signal attenuation among each pair of the plurality of network elements;
wherein the processor
determines interference within the wireless network based on the performance data that is generated,
generates an interference matrix identifying the interference in the wireless network,
generates an adjacency matrix based on the interference matrix identifying locations having unacceptable levels of interference in the wireless network,
allocates channel frequencies and corresponding transmission powers in the wireless network, based on the adjacency matrix, to maximize an aggregate throughput of the wireless network;
models the adjacency matrix as a graph by creating a vertex for each network element of the plurality of network elements; and
prunes one or more most recently added nodes from the graph modeled from the adjacency matrix with created vertexes, starting with a newest added node when a total number of nodes exceeds a designated number of nodes so that a smaller graph results; and a storage for storing the interference matrix and the adjacency matrix.

19. The server according to claim 18, wherein the processor further
prunes at least one edge of the graph of the adjacency matrix so that the graph does not exceed a predetermined number of available communication channels when at least one additional network element is added to a local area network.

20. The server according to claim 19, wherein a most recently added network element has power reduced by the pruning the at least one edge.

* * * * *

UNITED STATES PATENT AND TRADEMARK OFFICE
CERTIFICATE OF CORRECTION

| | | |
|---|---|---|
| PATENT NO. | : 10,952,225 B2 | Page 1 of 1 |
| APPLICATION NO. | : 15/922622 | |
| DATED | : March 16, 2021 | |
| INVENTOR(S) | : Raj Savoor, Canhui Ou and Jin Wang | |

It is certified that error appears in the above-identified patent and that said Letters Patent is hereby corrected as shown below:

On the Title Page

Item (73), Assignee:, delete "SBS Knowledge Venture, L.P." and insert therefor -- "AT&T Intellectual Property I, L.P." --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*